2,784,139

THIXOTROPIC WOOD PRESERVATION COMPOSITION AND PROCESS FOR PREPARING SAME

Hazel H. Cutler, Muncie, Ind.

No Drawing. Application May 28, 1953,
Serial No. 358,180

13 Claims. (Cl. 167—38.7)

This invention relates to wood-preserving compositions, especially to compositions for application to wood poles, as to standing wood poles adjacent the ground line thereof, as a preservative and to protect the poles from fungus and insect attack; and to the process of making such compositions.

It is an object of the invention to provide wood preservative compositions which can be readily applied as a coating on, and will adhere to and sustain themselves on, the surface of a wood pole and especially the surface of a standing wood pole, which will contain and carry to the pole one or more preservative agents to sterilize, penetrate, or protect the wood, or to maintain a fungus and insect barrier about the wood and supply mycocidal and insecticidal agents to the wood and to the soil surrounding the base of a wood pole. It is an object of the invention to provide such a preservative composition in paste-like or semi-liquid form, for application to the base of a standing pole, which will establish a sterile barrier to protect the wood of the pole, and which will provide flame resistance to the coated area. It is an object of the invention to provide such a coating which may be readily applied to the surface of a standing wood pole above and below the ground line and which will provide a long-lasting protection for the pole.

In accordance with the invention, the compositions comprise essentially a silicone product, preferably a reaction product or complex of a siliconate with a weak-acid, desirably a phenol and most desirably one which itself has preservative or protective properties. The compositions are normally prepared in and with a liquid carrier which may be a preservative liquid, and may include mycocidal and insecticidal solids or liquids. It may also contain an additional silicone compound selected for its water-repellant properties.

The compositions in accordance with the invention may be prepared in a paste-like form for application as a plastic mass to the surface of standing wood poles, such as the surfaces immediately below the ground line, or may be prepared as paint-like mixtures, or may be prepared with volatile solvents for spray application.

The essential silicone product provides a certain body to the composition, to provide a mixture which is relatively thick and viscous in its normal state but which becomes plastic or thinner when stirred or otherwise worked, to facilitate its application, and then again stiffens or thickens in place on the wood pole to maintain itself on that surface. The silicone product (or some component thereof) is believed also to improve the adherence of the composition to the pole surface, to improve the penetration into the wood of preservative liquids contained in the composition, and to retard the entrance of moisture into the wood and the effects of moisture on other ingredients of the composition. It acts as a binder or carrier for other constituents in the composition. It binds solids in a stable suspension, and holds in the mixture relatively large quantities of liquid preservatives, as by adsorption, in a relationship in which the liquids readily transfuse from the composition to penetrate the wood.

With the silicone product, a paste-like composition may contain a large proportion of finely divided solid filler, preferably of ingredients having mycocidal or insecticidal properties, yet will become semi-solid upon stirring to permit convenient application to the surfaces of a standing wood pole, and will revert to the relatively stiff state promptly after such application to maintain itself upon the pole. Further, such a paste-like composition may contain a large proportion of normally liquid preservative compounds which are held or absorbed in the semi-solid composition during application but which will readily transfuse from the composition to penetrate the wood.

The essential silicone product is desirably formed by reaction in admixture with other constituents, especially when the compound is to contain a considerable proportion of normally solid ingredients, but less desirably may be reacted separately in a liquid carrier and subsequently mixed with other ingredients. The silicone reactant used is a metal siliconate, such as a copper or iron siliconate, or preferably an alkali-metal siliconate, such as sodium or potassium or ammonium siliconate. The siliconate is preferably a substituted siliconate, and desirably a lower-aliphatic siliconate, such as the alkali-metal methyl, ethyl, propyl, and other lower-aliphatic siliconates. It is desirably brought together with the other ingredients in the form of an aqueous solution, for example, a 20 percent aqueous solution. By "alkali-metal," I mean to include ammonium, which acts chemically like an alkali metal and for present purposes is equivalent thereto.

The silicone reactant is reacted with a weak acid. Weak acids as a class appear to be operative to form a reaction product which thickens and stiffens the mixture, but I preferably use a phenol, for I believe the phenols enter the reaction to give especially desirable reaction products. In addition, the phenols generally provide toxic or wood-preservative properties. Phenols which may be used include phenol itself, naphthols, anthrols, phenanthrols, etc., and their substitution products, especially products containing halo, nitro, and hydroxy substituents, such as dinitrophenol, trinitrophenol, resorcinol, dichlorophenol, trichlorophenol, and especially pentachlorophenol.

The liquid carrier may be aqueous, but preferably is an organic liquid. It acts as a diluent for the reaction mixture. When the weak acid is a phenol, an organic liquid carrier acts as a solvent to carry the phenol to the reaction. The carrier may also, and desirably usually does, act as a diluent and spreading agent for the final composition. Where these are its only functions, the carrier may be any convenient organic solvent, such as fuel oil, xylene and, other organic solvents. Where an organic preservative liquid is desired in the final composition, the liquid carrier may be such a preservative liquid, and where this function is desired, I preferably use creosote as the liquid carrier. By creosote I mean the indeterminate organic mixtures such as those derived from coal tar and wood tar and prepared commercially as wood preserving liquids. The creosote may contain acid constituents which enter the reaction with the silicone reactant.

The mycocidal and insecticidal ingredients employed in the composition may be any of a wide variety of known compounds having these protective properties, including alkali-metal dichromates, alkali-metal fluorides, zinc chloride, chromated zinc chloride, copper sulphate, arsenic compounds, mercury compounds such as mercuric chloride, phenyl-mercuric-borate, etc., and mixtures of such compounds. Among these, the zinc chloride and its compounds tend to produce side-reactions, as with the silicone compound, and are preferably added to the reaction mixture in a controlled manner. The composition may contain one or more silicone compounds selected for their water-repellant properties, and these may be included in the mixture in solution in the organic liquid carrier or preferably may be added to the reaction mixture after the reaction has taken place.

To prepare a composition for spray application in accordance with the invention, an aqueous solution of the silicone reactant, for example, sodium-methyl-siliconate is mixed with a solution of the weak acid, for example, pentachlorophenol in solution in fuel oil. The siliconate and the acid react to form a thickened reaction mixture, which may be applied as such or after dilution with additional fuel oil or other solvent. A paint-like composition may be prepared in a similar manner, using creosote instead of fuel oil. In this case again, the reaction produces a thickened mixture of heavy paint-like consistency which may be applied to a wood surface and from which the creosote will transfuse into the wood. In either the spray or the paint composition, a water-repellant silicone, such as an organo-silicon-halide, may be added.

My invention is especially applicable to the preparation of a paste-like composition suitable for application to the base portions of standing wood poles over the areas immediately above and below the ground line. Such a paste-like composition may be prepared by first mixing the micocidal and insecticidal solids (except zinc chloride) with a water solution of the siliconate, and combining this mixture with a solution of the weak acid, for example, a solution of pentachlorophenol in an organic liquid carrier, preferably creosote. In the absence of the siliconate, such a mixture consists of a liquid base of relatively low viscosity containing the solids in a granular and readily separable state. With the siliconate present to react with the other constituents, for example, with the pentachlorophenol or with acid constituents of the creosote, the resulting mixture is a thick paste-like mass in which the liquid creosote seems to be held by adsorption and from which it does not separate upon standing but from which it will readily transfuse into the wood to which the composition is applied.

The consistency of such a solids-containing composition may be varied over a wide range and depends upon the amount of silicone product present, on the amount and kind of solid materials present, and on the amount of carrier present. The normal thickening provided by the silicone reaction product may be temporarily reduced or destroyed by stirring or other working of the composition so that the composition becomes more plastic or more liquid for ease of application. After application, the thickening and stiffening effect of the reaction product reappears, to aid in supporting the composition on and about the surface to which it is applied.

The following are examples of the invention:

*Example 1*

Four parts of powdered potassium dichromate is thoroughly mixed with 76 parts of sodium fluoride powder, and this mixture is combined with 20 parts of a 20 percent aqueous sodium-methyl-siliconate solution, containing 20 parts by weight of silicone solids and 80 parts by weight of water. The resulting mixture is a thick crumbly paste of substantially white color.

Ten parts of pentachlorophenol is dissolved in 90 parts of commercial-grade creosote liquid, and the mixture prepared as set forth above is added to this creosote solution and thoroughly mixed therewith. A reaction takes place during this mixing, and the mixture changes color and consistency. After the reaction has taken place, the mixture is a paste-like mass, which solidifies to a somewhat granular solid of putty-like consistency. When this product is stirred or otherwise worked, it becomes plastic so that it may be readily applied to a standing wood pole, as with a trowel, and after application solidifies as a paste-like coating on the wood.

Compositions prepared as set forth in this example are especially suited for application to the surface of standing wood poles adjacent the ground line. For this purpose, the earth is dug away from the standing pole to a depth of about two feet, and the surface of the pole is cleaned of adhering earth. If desired, any rotted or soft wood on the exterior of the pole may be removed to expose sound wood to receive the coating, but preferably such soft wood is left in place to provide a matrix for the absorption of protective and sterilizing constituents from the applied coating. The semi-solid composition is stirred so that it takes on a plastic consistency, and it is then applied to the base of the wood pole with a trowel to form an adherent coating.

The composition readily adheres to the wood and the coating may be about one-eighth inch in thickness, and extends over the entire circumference of the pole from a point of about six inches above the ground to a depth from fifteen to eighteen inches below the ground line. A protective wrapping, as of asphalt paper, may be applied over the coating if desired, and the earth dug from around the pole may be immediately replaced.

The coating stiffens promptly after its application to retain itself on the pole, and the upper and exposed portion of the coating hardens as it stands exposed to the atmosphere. The creosote solution contained in the coating, including creosote and pentachlorophenol dissolved therein, diffuses from the coating and is absorbed by and penetrates into the wood and along the grain of the wood from the edges of the coating. The coating is wettable by water, but the absorption of water through the coating into the wood is very much slower than with uncoated pole sections. Coated pole and other wood sections have been tested. It was found that the coating remained adherent to the wood throughout long periods of immersion in water. When coated sections were kept wet, it was found that sodium fluoride from the coating had been carried deep into the wood to destroy and provide a sterile area against fungus infections. With coated standing poles (not wrapped), it was found that sodium fluoride was carried into the earth surrounding the coated pole base, to sterilize that surrounding earth.

Further test showed that after coated poles had stood in the atmosphere for periods as short as one day, and even though the coatings still contained a considerable proportion of creosote which had not yet diffused into the wood, the coatings effectively retarded the burning of the poles by fire, and that this fire retarding effect increased with longer standing.

The paste-like coatings prepared in accordance with the invention provide a highly desirable combination of protecting and preserving properties. The preservative creosote and the mycocidal pentachlorophenol is absorbed from the coating into the wood, and a supply of liquid for such absorption is maintained in contact with the wood over a long period. The mycocidal sodium fluoride is held in the coating as a sterile barrier and, when the coating is moist, is slowly carried therefrom into the wood and into the surrounding earth, to sterilize both the wood and that surrounding earth. After a short period of drying, the coating forms a fire-retardant barrier about the base of the pole, to resist the effects of grass fires which frequently destroy standing poles.

*Example 2*

Many variations can be made in a composition as set forth in Example 1. Instead of sodium-methyl-siliconate, other metal siliconates can be used, for example, those containing other metal substituents, including iron, copper, and alkali metals, such as potassium and ammonium; and in which the organic substituent is other than methyl, for example, ethyl, propyl, and other lower-aliphatic substituents. Instead of pentachlorophenol used in Example 1, other weak acids can be used, including those having toxic properties and those which have no such toxic properties. Other phenols which can be used include polyhydric phenols, halogenated phenols such as di- and tri-chloro phenol, nitro-substituted phenols such as dinitrophenol, and substituted or unsubstituted mono or polyhydric naphthols, anthrols, etc. Instead of potassium dichromate and sodium fluoride, other inorganic compounds having mycocidal or insecticidal properties can be used, including sodium and ammonium dichromates, various alkali-metal fluorides, and various arsenic and mercury mycocidal compounds.

Example 3

In a composition of Example 1, a silicone compound selected for its water-repellant properties, such as an organo-silicon-halide, is added after completion of the reaction. Its presence in the coating retards the wetting of the coating by water and the carrying away from such coating and into the wood and the surrounding earth the water-soluble protective ingredients which it contains. While this may retard somewhat the development of a sterile area in the ground, to that extent it tends to retain the protective compounds in the coating on the base of the pole.

Example 4

In Examples 1 and 2, instead of mixing the metal siliconate with the solids before adding the creosote solution, the solids can be first mixed with the creosote solution and the aqueous solution of sodium methyl siliconate or other essential silicone compound added subsequently. I find, however, that this produces a somewhat more syrupy and less solid product, and I prefer the method set forth in Examples 1 and 2.

Example 5

As noted above, zinc chloride is reactive with other ingredients, I believe especially with the alkali-metal siliconate. A composition containing zinc chloride is prepared as follows:

A solution of 10 parts of pentachlorophenol and 90 parts of creosote is first prepared. A mixture of 20 parts of potassium dichromate and 20 parts of a 20 percent aqueous solution of sodium methyl siliconate is mixed with the creosote solution and stirred until the reaction is complete. Sixty (60) parts of zinc chloride is then stirred into the reaction mixture.

Example 6

A mixture of 10 parts of pentachlorophenol and 10 parts of xylene is mixed with 20 parts of sodium methyl siliconate solution (20 percent). The pentachlorophenol and the siliconate react to form a reaction product in the form of a crumbly and spongy solid.

This is added to a mixture of powdered potassium chromate and sodium fluoride powder in creosote, that is, to a mixture containing all of the ingredients used in Example 1 except the siliconate and the pentachlorophenol. The final composition resulting from this mixture is not thickened to quite the same extent as that produced in Example 1 where the reaction took place in the presence of other ingredients, but the normally liquid creosote was adsorbed by the reaction product, and the composition had the property of becoming thinner upon stirring and becoming thicker when left to stand.

Example 7

A solution of 25 parts of pentachlorophenol in 50 parts of fuel oil is mixed with 50 parts of a 20 percent solution of sodium methyl siliconate and stirred. A reaction occurs which produces a gelatinous thickening of the mixture. The mixture, with or without the addition of thinner, is applied to wood-pole surfaces. It forms a coating thereon from which a fuel oil solution of pentachlorophenol is absorbed into the wood.

Example 8

A solution of 10 parts of pentachlorophenol in 50 parts of creosote is mixed with 40 parts of a 20 percent aqueous solution of sodium methyl siliconate. A reaction occurs which results in the substantial thickening of the normally liquid creosote. The resulting product is of heavy paint-like consistency and is applied to wood surfaces as a preservative. In this composition, about 2 percent of a silicone such as methyl trichlorosilane is preferably added after the reaction has taken place to increase the water-repellant properties of the composition.

While the chemistry of the reaction or reactions which occur in my compositions is not fully understood, the results of the foregoing and other examples make it clear that a reaction product does occur. When the reaction product is formed in fuel oil as in Example 7, or in creosote as in Example 8, and a quantity of the resulting mixture is placed on an absorbent surface, liquid transfuses from the composition into the absorbent material, leaving on the absorbent surface a stiff mass which has a crystalline or fibrous appearance and which appears as an inter-laced mass of long slender crystals or fibers. The mass, however, is not hard and the crystals or fibers are not rigid, but the mass can be worked to an amorphous consistency. It is believed that as the reaction product is created in a liquid or oily carrier, such as fuel oil or creosote, it forms a fibrous matrix which adsorbs and holds within the interstices of the matrix or latticework a quantity of the liquid carrier so that the resulting mixture exists in a stable condition in which that liquid is held against a tendency to rise to the top. The matrix or lattice-work is substantially self supporting against settling and holds the liquid in a stable relationship and against its tendency to rise to the surface. The matrix or lattice-work is broken by working and converted to an amorphous state from which it will reform as a stable matrix or lattice-work when the working is interrupted.

These results appear more prominently in a reaction mixture in which the liquid carrier is creosote, which indicates that the creosote contains acid constituents which enter the reaction.

When this matrix or fibrous reaction product is formed in a mixture which contains finely divided solids insoluble in the carrier, it forms itself between the solids so that it is inter-laced with the particles to bind them into a stable porous mass, in which liquid carrier is adsorbed and held. Upon standing the mass becomes stiff because of the formation of the fibrous matrix, but becomes plastic upon working because the matrix breaks down and is converted to an amorphous condition.

I claim as my invention:

1. A wood-preservative composition, comprising an organic wood-preservative liquid, and a product of reaction in such liquid of at least about 2% of an alkali-metal lower-aliphatic siliconate and at least about 5% of a phenol, said reaction product thickening the composition, the thickened composition being applicable to a wood surface and retaining itself and the preservative liquid in place on the wood surface.

2. A wood-preservative composition as set forth in claim 1 in which the phenol is a substituted phenyl hydroxide.

3. A wood-preservative composition as set forth in claim 1 in which the phenol is a chloro-phenol.

4. A wood-preservative composition as set forth in claim 1 in which the phenol is a chlorine-substituted phenyl hydroxide.

5. A wood-preservative composition as set forth in claim 1 in which the phenol is pentachlorophenol.

6. A wood-preservative composition as set forth in claim 1 in which the organic wood-preservative liquid comprises creosote.

7. A wood-preservative composition as set forth in claim 1 in which the alkali-metal lower-aliphatic siliconate is sodium methyl siliconate.

8. A wood-preservative composition as set forth in claim 1 in which the alkali-metal lower-aliphatic siliconate is sodium methyl siliconate and the phenol is pentachlorophenol.

9. A wood-preservative composition adapted to be applied to a wood surface, comprising a finely divided solid toxic inorganic salt material, a binder reaction product of an alkali-metal lower-aliphatic siliconate and a phenol, the proportion of said siliconate being at least about 2% of the total composition, and the proportion of said phenol being at least about 5% of the total composition, and an organic wood-preservative liquid held as by adsorption in the mixture of solid material and binder and from which the liquid readily transfuses for absorption by the wood to which the composition is applied.

10. A wood-preservative composition adapted to be applied to the ground-line portion of a standing wood pole, comprising a finely divided solid toxic inorganic salt material, a reaction product of an alkali-metal lower-aliphatic siliconate and a creosote solution of pentachlorophenol distributed through the solid material, the proportion of said siliconate being at least about 2% of the total composition, and the proportion of said pentachlrophenol being at least about 5% of the total composition, and unreacted creosote solution held as by adsorption in the mixture of solid material and reaction product and from which it is free to be absorbed by the wood to which the composition is applied.

11. The method of preparing a wood-preservative composition which comprises mixing an aqueous solution of an alkali-metal lower-aliphatic siliconate with an organic solution of pentachlorophenol, the proportion of siliconate being at least about 2% of the total composition and the proportion of pentachlorophenol being at least about 5% of the total composition, thereby producing a reaction product of the siliconate and the pentachlorophenol which on standing exists as a matrix in which the organic liquid is held as by adsorption.

12. The method of preparing a wood-preservative composition as set forth in claim 11 in which the organic liquid solution comprises creosote.

13. The method of preparing a wood-preservative composition, which comprises mixing an aqueous solution of an alkali-metal lower-aliphatic siliconate with finely divided solid material, and subsequently mixing therewith an organic liquid solution of pentachlorophenol, the proportion of siliconate being at least about 2% of the total composition and the proportion of pentachlorophenol being at least about 5% of the total composition, thereby producing a reaction product of the siliconate and pentachlorophenol distributed throughout the mixture as a binder, with organic liquid held as by adsorption in the mixture of solid material and binder.

References Cited in the file of this patent

UNITED STATES PATENTS

| | | |
|---|---|---|
| 2,438,055 | Hyde | Mar. 16, 1948 |
| 2,441,423 | Elliott et al. | May 11, 1948 |
| 2,507,200 | Elliott et al. | May 9, 1950 |
| 2,587,636 | McMullen | Mar. 4, 1952 |
| 2,599,373 | Chrzanowski | June 3, 1952 |

OTHER REFERENCES

Meads et al.: "Jour. Chem. Soc." (London), vol. 107 (1915), pp. 459–68.